(12) United States Patent
Varache et al.

(10) Patent No.: US 12,332,187 B2
(45) Date of Patent: Jun. 17, 2025

(54) PHOTOLUMINESCENCE MEASUREMENT DEVICE

(71) Applicant: COMMISSARIAT A L'ENERGIE ATOMIQUE ET AUX ENERGIES ALTERNATIVES, Paris (FR)

(72) Inventors: Renaud Varache, Grenoble (FR); Patrick Jeremy Dahan, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 203 days.

(21) Appl. No.: 18/249,454

(22) PCT Filed: Oct. 20, 2021

(86) PCT No.: PCT/FR2021/051831
§ 371 (c)(1),
(2) Date: Apr. 18, 2023

(87) PCT Pub. No.: WO2022/084627
PCT Pub. Date: Apr. 28, 2022

(65) Prior Publication Data
US 2023/0400418 A1 Dec. 14, 2023

(30) Foreign Application Priority Data
Oct. 21, 2020 (FR) ..................... 2010774

(51) Int. Cl.
*G01N 21/95* (2006.01)
*G01N 21/64* (2006.01)
(Continued)

(52) U.S. Cl.
CPC ..... *G01N 21/9505* (2013.01); *G01N 21/6489* (2013.01); *G01N 21/956* (2013.01);
(Continued)

(58) Field of Classification Search
CPC ........... G01N 21/9505; G01N 21/6489; G01N 21/956; G01N 2021/646;
(Continued)

(56) References Cited

U.S. PATENT DOCUMENTS 5,741,171 A * 4/1998 Sarfaty ................... B24B 37/04
451/6
8,269,830 B1 9/2012 Delaney
(Continued)

FOREIGN PATENT DOCUMENTS

WO WO 2019/117228 A1 6/2019

OTHER PUBLICATIONS

International Search Report and Written Opinion issued Jan. 31, 2022 in PCT/FR2021/051831 filed on Oct. 20, 2021 21 pages.
(Continued)

*Primary Examiner* — Seung C Sohn
(74) *Attorney, Agent, or Firm* — Oblon, McClelland, Maier & Neustadt, L.L.P.

(57) ABSTRACT

A photoluminescence measurement device may include: a sample holder; a detector configured to collect a photoluminescence signal; a processing unit configured to process a signal collected by the detector; and a support disposed facing a rear face of the sample holder, opposite to the front face, and on one face, called the main face, of which rests at least one radiation source for emitting light radiation illuminating the rear face and likely to be collected, by transparency of the sample holder with respect to the light radiation, by the detector.

12 Claims, 6 Drawing Sheets

(51) Int. Cl.
*G01N 21/84* (2006.01)
*G01N 21/956* (2006.01)
*H02S 50/15* (2014.01)

(52) U.S. Cl.
CPC ........ *H02S 50/15* (2014.12); *G01N 2021/646* (2013.01); *G01N 2021/8461* (2013.01)

(58) Field of Classification Search
CPC ........... G01N 2021/8461; G01N 21/66; G01N 2201/0626; G01N 2201/0631; G01N 2201/0634; H02S 50/15; Y02E 10/50

USPC ...................................... 356/237.1
See application file for complete search history.

(56) References Cited

U.S. PATENT DOCUMENTS 10,672,119 B2 * 6/2020 Yamaguchi ............... G06T 7/64
2006/0029284 A1 2/2006 Stewart

OTHER PUBLICATIONS

Song, Mei-Ping et al. "Research on Broken Corner and Black Edge Detection of Solar Cell" Proceedings of the 2018 International Conference on Machine Learning and Cybernetics (ICMLC), IEEE, vol. 1, Jul. 15, 2018, pp. 80-84 (5 pages).
Williams, D.J. et al. "Normalized edge detector" Proceedings of the International Conference on Pattern Recognition. Atlantic City, Jun. 16-21, 1990. Conference A: Computer Vision and Conference B: Pattern Recognition Systems and Applications. pp. 942-946 (5 pages).
Bao-Shan, Shi et al. "A Method for Threshold Selection in Edge Width Detection of Objects in the Image" 2009 International Conference on Signal Processing Systems, IEEE May 15, 2009. pp. 402-405 (4 pages).

* cited by examiner

PHOTOLUMINESCENCE MEASUREMENT DEVICE

CROSS-REFERENCE TO RELATED APPLICATIONS

The present application is the national stage of international application PCT/FR2021/051831, filed on Oct. 20, 2021, and claims the benefit of the filing date of French Appl. No. 2010774, filed on Oct. 21, 2020.

TECHNICAL FIELD

The present invention is directed to the field of characterization, and more particularly to characterization by photoluminescence or electroluminescence measurement.

The invention especially relates to a photoluminescence measurement device for improving detection, as well as characterization, of the edges of samples measured by said device.

The device according to the present invention is, in this respect, advantageously implemented for characterizing edges of photovoltaic cells formed on or in silicon substrates.

STATE OF PRIOR ART

Photoluminescence or electroluminescence measurements are choice techniques to test electronic and/or optical properties of materials, especially semiconductor materials.

In practice, photoluminescence measurements implement excitation of a material by a source of light radiation so as to promote transition of electrons of said material from their ground energy level (also called "equilibrium state") to higher energy levels. The source of light radiation can, for example, be laser radiation or the radiation of a light emitting diode.

Electrons thus promoted return to their equilibrium state according to radiative or non-radiative recombination paths in dependence on the quality of the material tested. In this respect, those skilled in the art will find in document [1], mentioned at the end of the description, a study of radiative and non-radiative recombination modes occurring during a photoluminescence measurement.

In particular, non-radiative recombinations, generally associated with the presence of defects or Auger-type phenomena, occur at the expense of radiative recombinations.

The rate of radiative recombinations, whose level or intensity measured over time represents the photoluminescence signal, makes it possible to characterize quality of the material tested. In particular, photoluminescence measurements make it possible to detect and/or locate defects likely to be present in the material tested.

According to a particular spatially resolved photoluminescence technique developed by Trupke et al. and described in document [2] mentioned at the end of the description, it is also possible to establish photoluminescence mapping of the sample tested and especially to track defects of said sample.

In this respect, FIG. 1 represents a photoluminescence mapping, in grey levels, of a silicon sample resting on a base and comprising a surface passivated with amorphous silicon.

The lightest zones are the seat of a stronger rate of radiative recombinations than the darkest zones. Conversely, darker zones have a stronger rate of non-radiative recombinations than light zones. Light zones are therefore characteristic of a low defect density and dark zones are indicative of a significant defect density.

Among dark zones, the peripheral section or edge of the sample attracts particular attention.

Indeed, methods for manufacturing such samples, especially photovoltaic cells, involve particularly aggressive steps that can each contribute to the degradation of edges of said samples, which eventually concentrate a significant defect density.

This significant defect concentration results in a very low level of photoluminescence and therefore an impossibility to distinguish the edge of the sample from the base on which it rests. In other words, the contrast of the photoluminescence intensity between the edge of the sample and the base is insufficient to track said edge (FIG. 2).

In this respect, document [3] mentioned at the end of the description provides a method for better distinguishing the edge of the sample. This method especially requires the implementation of a base likely to emit a photoluminescence signal in order to improve contrast at the edge of the sample during a photoluminescence measurement.

However, the base may also have defects, especially in proximity to the edge of the sample, and consequently limit contrast improvement sought.

Furthermore, this method may require selection of a base that has an appropriate level of photoluminescence.

This document [3] also provides the implementation of a corona type charge on a rear face of the base.

Nevertheless, this method remains complicated to implement.

One purpose of the present invention is therefore to provide a photoluminescence measurement device that allows better distinction of sample edges and is simpler to implement than the methods provided in document [3].

DISCLOSURE OF THE INVENTION

The purpose of the invention is achieved by a photoluminescence or electroluminescence measurement device which comprises:
  a sample holder;
  a detector configured to collect a photoluminescence or electroluminescence signal emitted by a sample that may be disposed on a front face of the sample holder; and
  a processing unit configured to process a signal collected by the detector;
  the device being characterized in that it further comprises a support disposed facing a rear face of the sample holder, opposite to the front face, and on one face, called the main face, of which at least one radiation source for emitting light radiation illuminating the rear face and likely to be collected rests, by transparency of the sample holder with respect to said light radiation, by the detector.

According to one implementation, the at least one radiation source comprises a plurality of radiation sources arranged in a matrix form on the main face.

According to one implementation, said device further comprises a diffuser interposed between the sample holder and the support, and configured to homogenize light radiation likely to be emitted by the radiation sources.

According to one implementation, the sample holder, the diffuser and the support are held integral with each other by holding means.

According to one implementation, said device comprises at least one filter configured to filter in wavelength light radiation likely to be emitted by the radiation sources.

According to one implementation, when a sample having a contour C rests through a first face on the front face of the sample holder, and such that said sample is circumscribed by an overflow zone of the sample holder through which light radiation, likely to be emitted by the at least one radiation source, is likely to pass, said detector is also configured to establish mapping of the light intensity of the radiation likely to pass through the overflow zone and of the photoluminescence signal emitted by the sample.

According to one implementation, the processing unit comprises a computer program designed to implement the following steps:

a) a step of extracting a light intensity profile along a linear trace overlapping the contour of the sample, said profile comprising a first section associated with the intensity of the light radiation passing through the overflow zone, and a second section associated with the intensity of the photoluminescence of the electroluminescence emitted by the sample;

b) a step of determining the position $x_o$, associated with an intensity $y_o$ of the signal, and tracked from a reference position of the first section, of the contour on the light intensity profile, said locating step comprising a slope calculation, the position $x_o$ corresponding to a position for which a break of slope greater in absolute value than a predetermined value is observed in a direction from the first section to the second section, said predetermined value advantageously being greater than 10%.

According to one implementation mode, the computer program is also designed to implement the following steps:

c) a step of determining a reference intensity $y_{max}$ in the second section S2, said reference intensity $y_{max}$ corresponding to a sliding maximum;

d) a step of determining a first extent $E_1$ according to a so-called tangent method, said tangent method comprises the following substeps:

d1) calculating the slope $P_o$ of a straight line $D_o$ passing through the point of coordinates $x_o$ and $y_o$ and through another point of the edge of the sample taken on the linear trace;

d2) calculating a position, called target position $x_c$, for which the straight line $D_o$ has an ordinate equal to 70% of the deviation between the reference intensity $y_{max}$ and the intensity $y_o$;

d3) calculating a deviation between the target position x and the position $x_o$, said deviation being associated with the first extent $E_1$;

e) a step of determining a second extent $E_2$ according to a so-called direct method, said direct method comprises the following sub-steps:

e1) determining a position, called direct position $x_d$, for which the intensity, in the second section S2, is equal to 70% of the deviation between the reference intensity $y_{max}$ and the intensity $y_o$, e2) calculating a deviation between the direct position $x_d$ and the position $x_o$, said deviation being associated with the second extent $E_2$.

f) calculating an edge width D so defined as the minimum value between the first extent $E_1$ and the second extent $E_2$.

The sliding maximum, determined in step c), is sliding outside the curve, on the zone adjacent to the linear trace.

According to one implementation, the computer program is also designed to calculate a metric M representative of the amount of defects present at the edge of plates, the Metric M satisfies the following relationship:

$$M = \int_{x_o}^{D} \frac{y_{max} - y(x)}{y_{max}} dx \qquad \text{[Math 1]}$$

Where y(x) represents the variation in the intensity profile along the linear trace as a function of its position x.

According to one implementation, said device further comprises a light emission source (120) for inducing emission of a photoluminescence signal by a sample (200) likely to rest on the front face (111) of the sample holder (110).

According to one implementation, the detector (130) is configured to collect the photoluminescence signal.

BRIEF DESCRIPTION OF THE DRAWINGS

Further characteristics and advantages will become apparent in the following description of a photoluminescence measurement device according to the invention, given as non-limiting examples, with reference to the appended drawings in which:

FIG. 7a and FIG. 7b are mappings of the signal collected by the detector with the light emitting diodes being respectively turned off and on;

DETAILED DISCLOSURE OF PARTICULAR EMBODIMENTS

The present invention relates to a photoluminescence or electroluminescence measurement device provided with a sample holder on one side of which, called the front side, a sample is likely to rest.

The device moreover comprises a light emission source, for example a LASER, and a detector. The light emission source is especially for inducing emission of a photoluminescence signal by the sample, while the detector is arranged to collect said photoluminescence signal.

The device according to the present invention comprises at least one light emitting diode configured to emit light radiation illuminating the rear face of the sample holder. This radiation is especially adapted to pass, by transparency, through the sample holder.

Thus, during a photoluminescence measurement, the detector collects, on the one hand, the photoluminescence signal emitted by the sample, and on the other hand, light radiation passing through the sample holder at an overflow zone in which the sample is circumscribed.

The remainder of this statement is limited to the description of a device adapted for photoluminescence measurement. However, those skilled in the art will be able to generalize the concepts described to the electroluminescence measurement devices, just by reading the remainder of this statement and their general knowledge in the field of electroluminescence measurement. In this respect, they will be able to provide electrical contacts on one face of a sample to be measured by electroluminescence.

Figure 1:
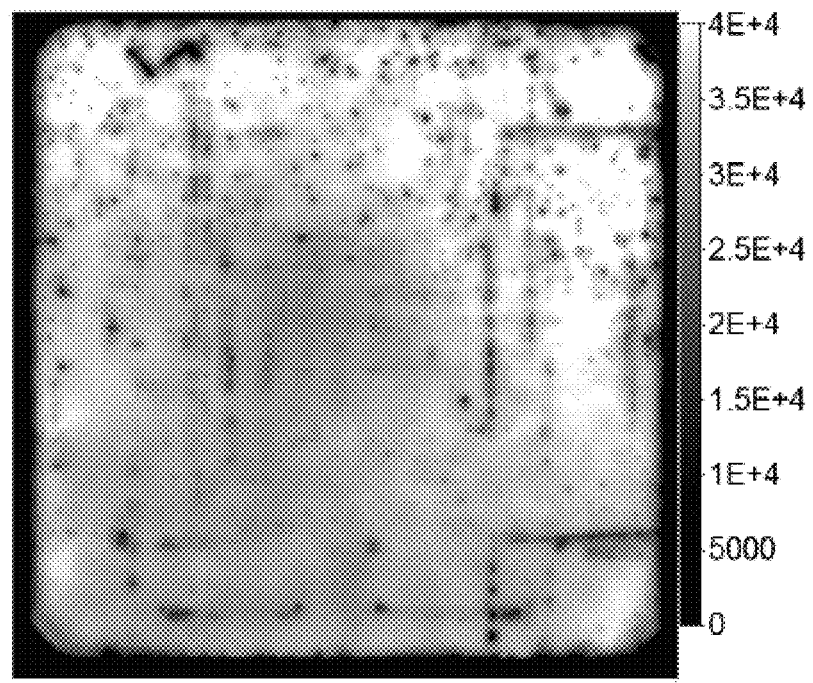
FIG. 1 is a mapping of the photoluminescence of a silicon sample resting on a sample holder measured according to a method known from the state of the art, the intensity of the photoluminescence is given according to a gray level scale attached to the figure.
Figure 2:
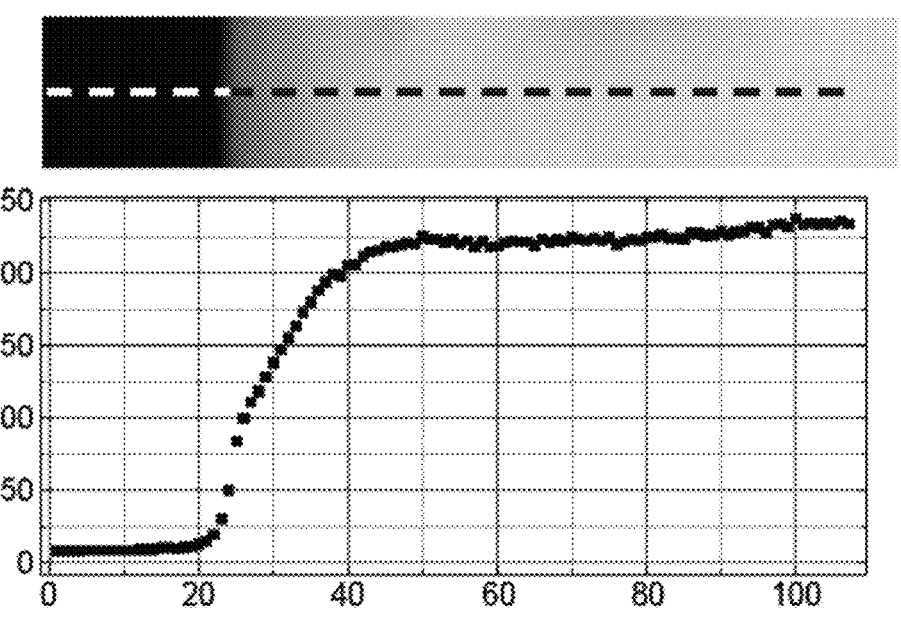
FIG. 2 is a graphical representation of a measurement profile of the photoluminescence intensity (along the vertical axis in arbitrary unit) as a function of a position along a segment (along the vertical axis in arbitrary unit) passing through the edge of the sample, the segment also being shown as a dashed line on a mapping section extracted from FIG. 1 and attached to said graphical representation.
Figure 3:
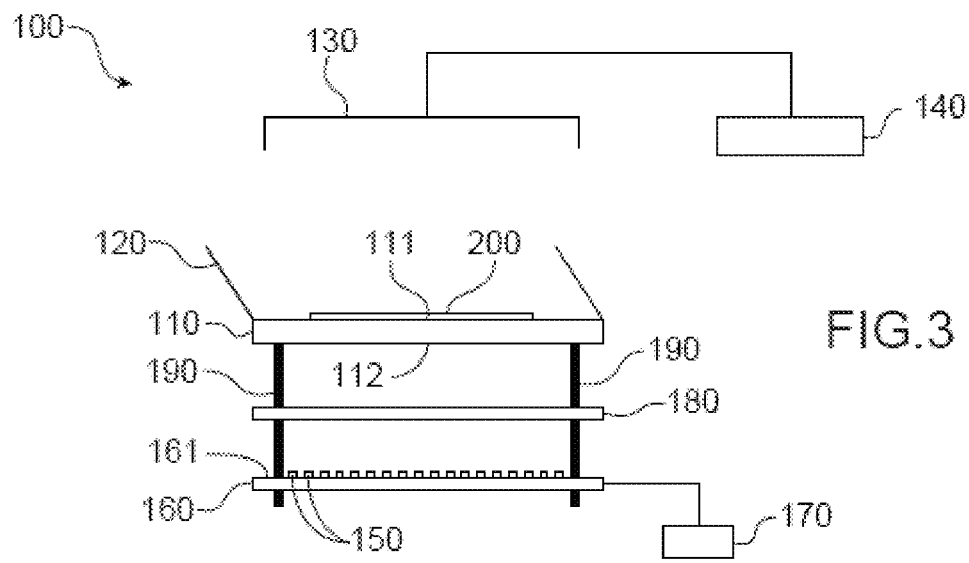
FIG. 3 is a schematic representation of the photoluminescence measurement device according to the present invention.

FIG. 3 is a schematic representation of a photoluminescence measurement device 100 according to the present invention.

The device 100 especially comprises a generally planar shaped sample holder 110. The sample holder 110 especially comprises two faces parallel to each other called the front face 111 and the rear face 112, respectively.

The device 100 also comprises a light emission source 120 for inducing a photoluminescence signal from a sample 200 resting on the front face 111 of the sample holder 110. The light emission source may comprise a laser in this respect.

The device 100 further comprises a detector 130. The detector 130 is more particularly arranged to collect a photoluminescence signal emitted by the sample 200 under the action of excitation by the light emission source 120. Advantageously, the detector forms a matrix of sensors, especially photosensitive sensors.

The detector 130 is moreover associated with a processing unit 140 configured to process the signal collected by the detector 130.

The processing unit may comprise a calculator, especially a processor, on which is loaded software or a computer program configured to perform steps leading to the processing of data collected by the detector 130.

The device 100 further comprises one or more radiation sources 150 arranged to emit light radiation illuminating the rear face 112 of the sample holder 100 (FIG. 3).

More particularly, the one or more diodes 150 may especially rest on a main face 161 of a support 160. In this respect, the support 160 may comprise an arrangement of metal tracks, in particular in the form of a printed circuit board, for ensuring connection of the radiation sources 150 with a generator 170. Advantageously, the generator 170 is configured to adjust intensity of the light radiation likely to be emitted from the one or more radiation sources 150. The generator may also be configured to supply the radiation sources only when the light emitting source 120 is actually emitting light radiation.

Figure 4:
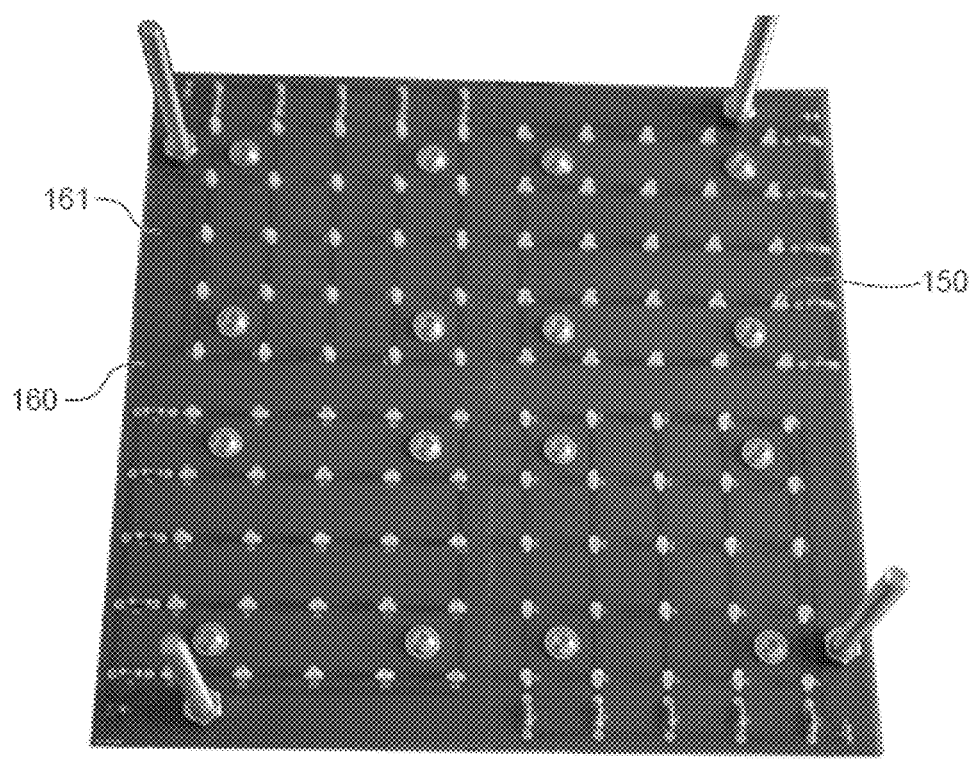
FIG. 4 is a photograph of a support on which light emitting diodes are arranged in a matrix form.

Advantageously, the at least one light emitting diode 150 comprises a plurality of radiation sources 150 arranged in a matrix form (FIG. 4).

By "arranged in a matrix form", it is meant an array with N rows and M columns. Each light emitting diode 150 is then disposed at the intersection of a row with a column of the array.

Moreover, the sample holder 110 is made of a material that is transparent with respect to the radiation emitted by the radiation sources 150.

In particular, the sample holder 110 may comprise an acrylic plate, frosted glass, or a polymer material. In this respect, the radiation sources 150 may be configured to emit light radiation with a wavelength less than 1,000 nm. For example, the radiation sources 150 may be configured to emit light radiation at 940 nm. In this respect, the radiation sources 150 may comprise lasers, halogen sources, or diodes emitting, for example, radiation at a wavelength of 940 nm from the Kingbright company.

According to this configuration, the light radiation likely to be emitted by the radiation sources 150 may be collected by the detector 130.

The device 100 may also comprise a diffuser 180 interposed between the sample holder 110 and the support 160, and configured to homogenize light radiation likely to be emitted by the radiation sources.

The diffuser 180 may comprise at least one of the materials selected from: acrylic plate, frosted glass or a polymer material.

Moreover, the sample holder 110, the diffuser 180 and the support 160 are advantageously held integral with each other by holding means. In this respect, the holding means may comprise tie rods 190.

Still advantageously, the device 100 may comprise at least one filter configured to filter in wavelength the light radiation likely to be emitted by the radiation sources. The implementation of one or more filters especially makes it possible to limit saturation of the detector 130 by the light radiation emitted by the radiation sources.

Figure 5:
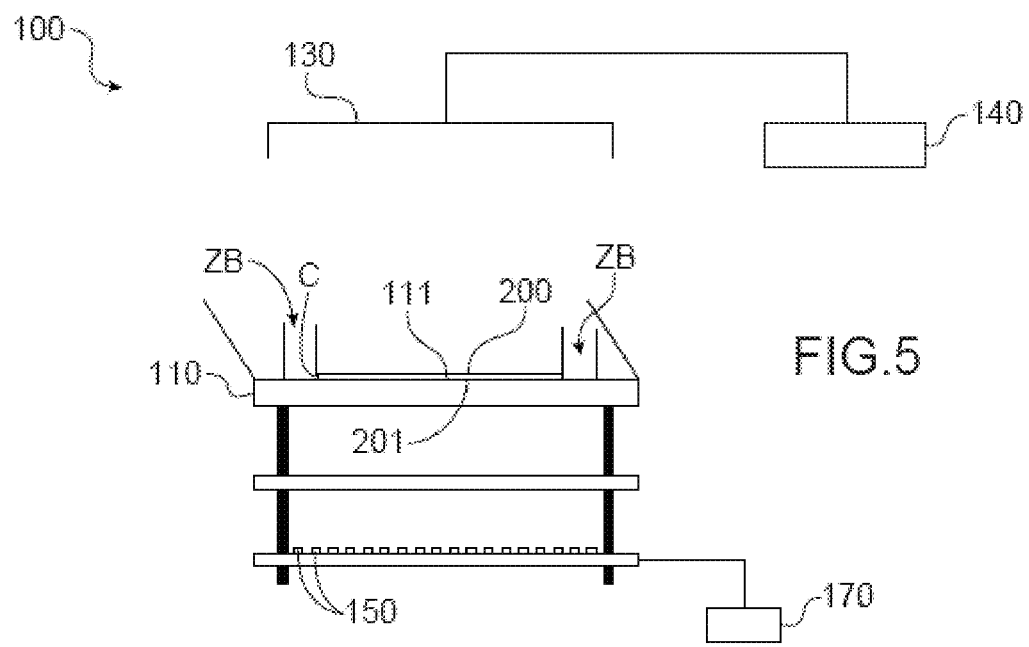
FIG. 5 is a schematic representation of the implementation of the device of FIG. 3 for photoluminescence measurement of a sample.

FIG. 5 is an illustration of the implementation of the photoluminescence measurement device 100 according to the present invention. The sample 200 to be characterized is then disposed on the front face 111 of the sample holder 110.

This sample 200 especially comprises a contour C and rests through a first face 201 on the front face 111 of the sample holder 110. The sample 200 is especially positioned on the front face 111 so as to be circumscribed by an overflow zone ZB of the sample holder 110 through which light radiation emitted by the at least one light emitting diode 150 is likely to pass. Thus, the detector 130 collects, on the one hand, the photoluminescence signal emitted by the sample 200 and, on the other hand, the signal associated with the light radiation emitted by the radiation sources and passing through the sample holder 110 at the overflow zone. The processing unit makes it possible to establish mapping of the intensity of the signal collected by the detector 130, this signal including on the one hand the photoluminescence signal emitted by the sample 200 and on the other hand the signal associated with the radiation passing through the overflow zone ZB.

Figure 6:
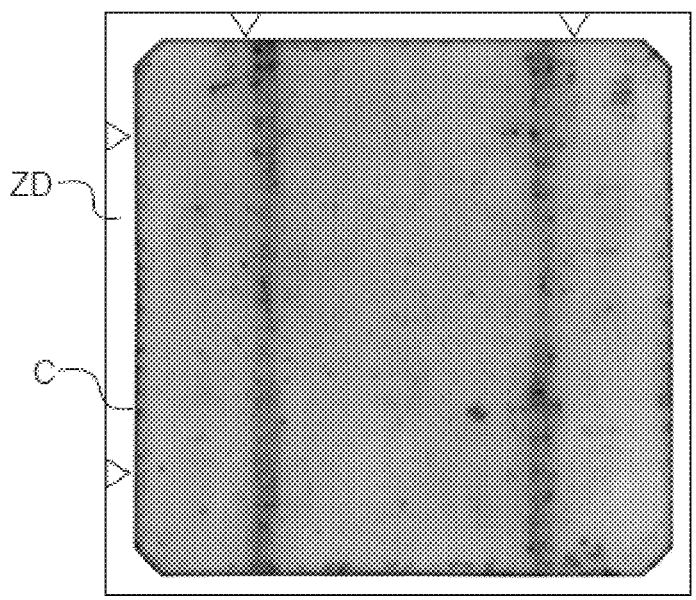
FIG. 6 is an example of mapping likely to be obtained after a photoluminescence characterization of a sample resting on the sample holder of the device of FIG. 3.

FIG. 6 represents mapping of the intensity of the signal collected by the detector 130 during this measurement. This mapping reveals two regions. More particularly, a gray region, called the first region, delimited by a dark contour and associated with the photoluminescence signal emitted by the sample, can be observed on this mapping. The other region, called the second region, is very light and is associated with the light radiation passing through the overflow zone. The delimitation, and more particularly the contrast, which is very clear between these two regions is a consequence of the implementation of the radiation sources.

Figure 7A:
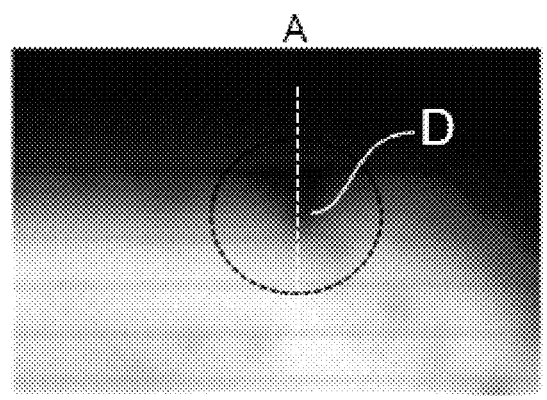
Figure 7B:
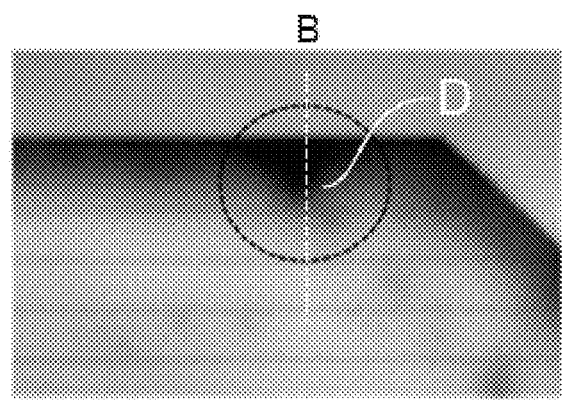
Figure 7C:
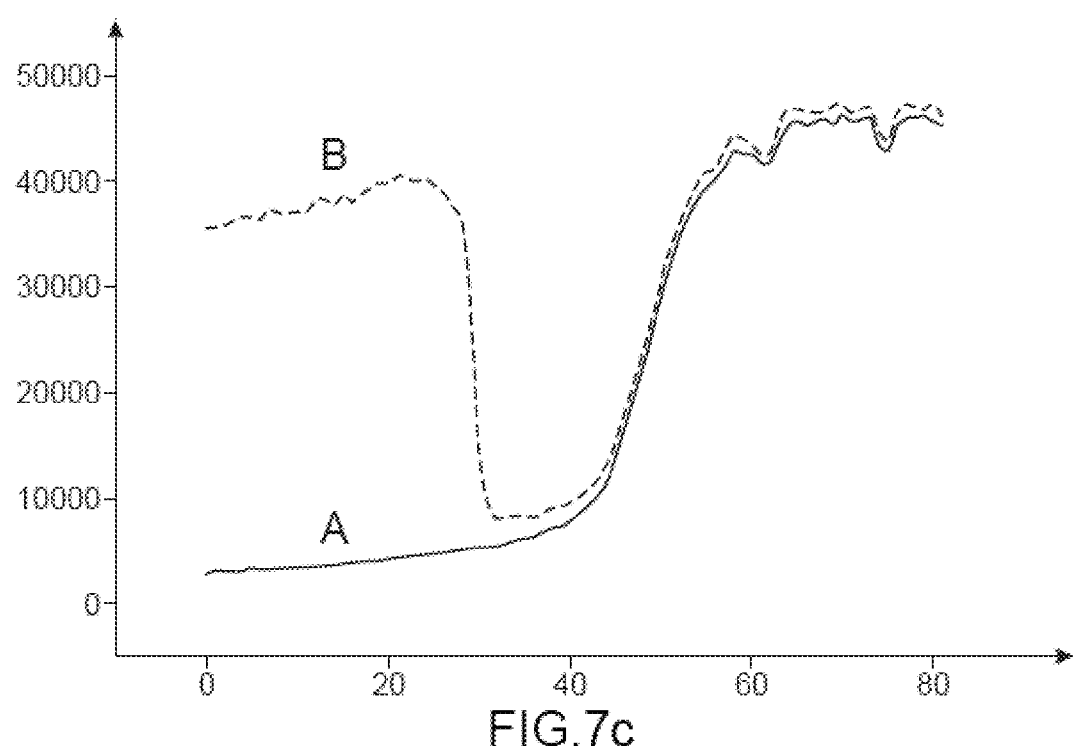
FIG. 7c is a graphical representation of intensity profiles collected by the detector along traces "A" and "B", respectively, of FIG. 7a and FIG. 7b.
Figure 8:
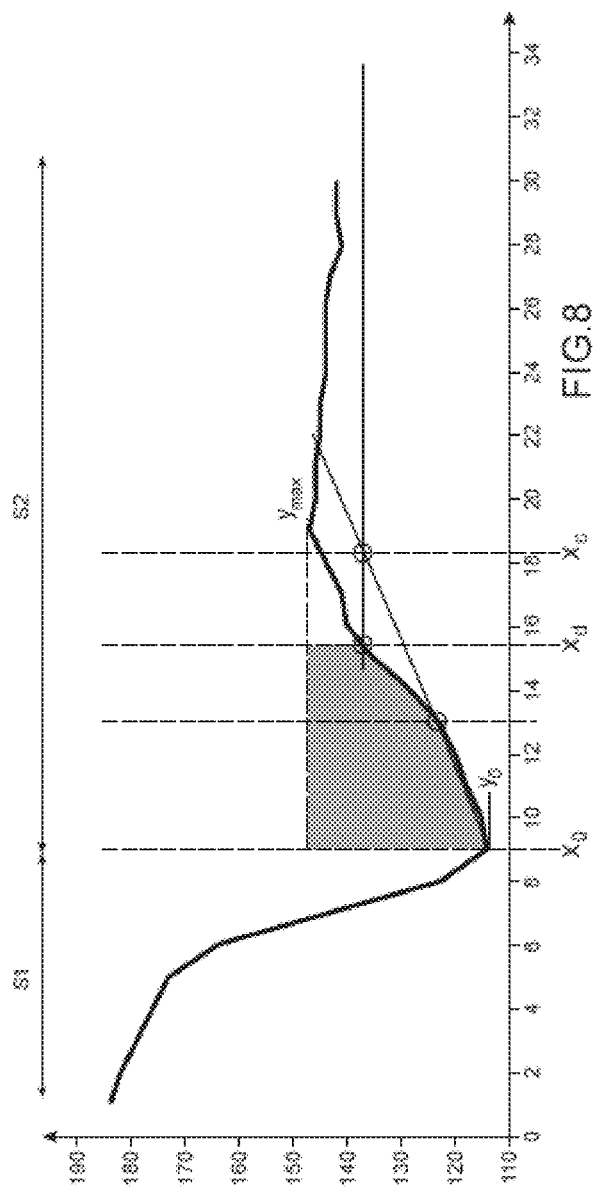
FIG. 8 is a graphical representation of the implementation of the computer program according to the present invention.

In this respect, FIG. 7a and FIG. 7b are mappings of the signal collected by the detector with the radiation sources being respectively turned off and on. Examination of these two mappings clearly illustrates the improvement in contrast when the radiation sources 150 are turned on. This improvement is even more noticeable when a defect D is in proximity to the edge of the sample. The signal intensity profiles "A" and "B" are represented graphically in FIG. 7c. Profile "A", obtained when the diodes are turned off, does not allow the edge of the sample to be tracked precisely. Profile "B", on the other hand, not only allows the edge of the sample to be accurately tracked but also allows the extent of the defect D to be extracted.

The device 100 according to the present invention also comprises a computer program loaded on the processing unit 140.

Especially the computer program is designed to implement the following steps:

a) a step of extracting a light intensity profile along a linear trace overlapping the contour C of the sample 200, said profile comprising a first section S1 associated with the intensity of the light radiation passing through the overflow zone ZD, and a second section S2 associated with the intensity of the photoluminescence of the sample 200;

b) a step of determining the position $x_o$, associated with an intensity $y_o$, tracked from a reference position of the first section S1, of the contour C on the light intensity profile. This locating step comprises a slope calculation. More particularly, the position $x_o$ corresponds to a position for which a break of slope greater in absolute value than a predetermined value is observed in a direction from the first section S1 to the second section S2. The predetermined value is advantageously greater than 10%.

The computer program may also be designed to implement steps that lead to the determination of the edge width of the sample. In particular, the computer program may comprise the following steps:

c) a step of determining a reference intensity $y_{max}$ in the second section S2, said reference intensity corresponding to a sliding maximum on a window framing the zone under study.

d) a step of determining a first extent $E_1$ according to a so-called tangent method.

Said tangent method comprises the following sub-steps:

d1) calculating the slope $P_o$ of a straight line $D_o$ passing through the point of coordinates $x_o$ and $y_o$ and through another point of the edge of the sample taken on the linear trace, the other point of the edge can for example be spaced by 3 to 8 pixels from the point $x_o$ (each pixel being a detection site of the detector).

d2) calculating a position, called target position $x_c$, for which the straight line $D_o$ has an ordinate equal to 70% of the deviation between the reference intensity $y_{max}$ and the intensity $y_o$, d3) calculating a deviation between the target position $x_c$ and the position $x_o$, said deviation being associated with the first extent $E_1$, e) a step of determining a second extent $E_2$ according to a so-called direct method. Said direct method comprises the following sub-steps:

e1) determining a position, called direct position $x_d$, for which the intensity, in the second section S2, is equal to 70% of the deviation between the reference intensity $y_{max}$ and the intensity $y_o$, e2) calculating a deviation between the direct position $x_d$ and the position $x_o$, said deviation being associated with the second extent $E_2$.

The edge width D is so defined as the minimum value between the first extent $E_1$ and the second extent $E_2$.

The computer program is designed to calculate a metric M representative of the amount of defects present at the edge of plates.

The metric M satisfies the following relationship:

$$M = \int_{x_o}^{D} \frac{y_{max} - y(x)}{y_{max}} dx \qquad \text{[Math 2]}$$

Where y(x) represents the variation in the intensity profile along the linear trace as a function of its position x.

The invention is thus advantageously implemented for the characterization of silicon-based photovoltaic cells.

This characterization can especially allow the cell cutting steps to be optimized, and thus the quality of the edges of said cells to be improved.

REFERENCES

[1] P. Würfel, S. Finkbeiner, and E. Daub, "*Generalized Planck's radiation law for luminescence via indirect transitions*", Appl. Phys. A Mater. Sci. Process, vol. 60, no. 1, pp. 67-70, January 1995,

[2] T. Trupke, R. A. Bardos, M. C. Schubert, and W. Warta, "*Photoluminescence imaging of silicon wafers,*" Appl. Phys. Lett. vol. 89, no. 4, p. 44107, July 2006,

[3] FR 3073944.

The invention claimed is:

1. A photoluminescence or electroluminescence measurement device, comprising:
 a sample holder;
 a detector configured to collect a photoluminescence or electroluminescence signal emitted by a sample likely to be disposed on a front face of the sample holder;
 a processing unit configured to process a signal collected by the detector; and
 a support disposed facing a rear face of the sample holder, opposite to the front face, and on a main face, of which at least one radiation source rests for emitting light radiation illuminating the rear face and likely to be collected, by transparency of the sample holder with respect to the light radiation, by the detector,
 wherein, when a sample having a contour C rests through a first face on the front face of the sample holder, and so that the sample is circumscribed by an overflow zone of the sample holder, through which light radiation, likely to be emitted by the at least one radiation source, is likely to pass, and
 wherein the detector is also configured to establish mapping of light intensity of the radiation likely to pass through the overflow zone and of the photoluminescence signal emitted by the sample.

2. The device of claim 1, wherein the at least one radiation source comprises a plurality of radiation sources arranged in a matrix form on the main face.

3. The device of claim 2, further comprising a diffuser interposed between the sample holder and the support, and
wherein the diffuser is configured to homogenize light radiation likely to be emitted by the radiation sources.

4. The device of claim 3, wherein the sample holder, the diffuser, and the support are held integral with each other by a holder.

5. The device of claim 4, further comprising:
a filter configured to filter in wavelength light radiation likely to be emitted by the radiation sources.

6. The device of claim 3, further comprising:
a filter configured to filter in wavelength light radiation likely to be emitted by the radiation sources.

7. The device of claim 1, wherein the processing unit comprises a computer program designed to implement a process comprising:
(a) extracting a light intensity profile along a linear trace overlapping the contour of the sample, the profile comprising a first section associated with the intensity of the light radiation passing through the overflow zone, and a second section associated with the intensity of the photoluminescence of the electroluminescence emitted by the sample;
(b) determining the position $x_o$, associated with an intensity $y_o$ of the signal, and tracked from a reference position of the first section, of the contour on the light intensity profile, the determining comprising a slope calculation, the position $x_o$ corresponding to a position for which a break of slope greater in absolute value than a predetermined value is observed in a direction from the first section to the second section, the predetermined value advantageously being greater than 10%.

8. The device of claim 7, wherein the computer program is further designed to implement:
(c) determining a reference intensity $y_{max}$ in the second section S2, said reference intensity $y_{max}$ corresponding to a sliding maximum;
(d) determining a first extent $E_1$ according to a so-called tangent method, the tangent method comprising:
(d1) calculating the slope $P_o$ of a straight line $D_o$ passing through the point of coordinates $x_o$ and $y_o$ and through another point of the edge of the sample taken on the linear trace;
(d2) calculating a position, called target position $x_c$, for which the straight line $D_o$ has an ordinate equal to 70% of the deviation between the reference intensity $y_{max}$ and the intensity $y_o$;
(d3) calculating a deviation between the target position $x_c$ and the position $x_o$, the deviation being associated with the first extent $E_1$;
(e) determining a second extent $E_2$ according to a so-called direct method, the direct method comprising:
(e1) determining a direct position $x_d$, for which the intensity, in the second section S2, is equal to 70% of the deviation between the reference intensity $y_{max}$ and the intensity $y_o$;
(e2) calculating a deviation between the direct position $x_d$ and the position $x_o$, the deviation being associated with the second extent $E_2$; and
(f) calculating an edge width D so defined as the minimum value between the first extent $E_1$ and the second extent $E_2$.

9. The device of claim 7, wherein the predetermined value is greater than 10%.

10. The device of claim 8, wherein the computer program is also designed to calculate a metric M representative of the amount of defects present at the edge of plates,
wherein the metric M satisfies equation (I):

$$M = \int_{x_O}^{D} \frac{y_{max} - y(x)}{y_{max}} dx, \qquad (I)$$

wherein y(x) represents a intensity profile variation along the linear trace as a function of its position x.

11. The device of claim 1, further comprising:
a light emission source configured for inducing emission of a photoluminescence signal by a sample likely to rest on the front face of the sample holder.

12. The device of claim 11, wherein the detector is configured to collect the photoluminescence signal.

* * * * *